March 21, 1939. G. APPELL 2,151,181
VEHICLE COUPLING
Filed June 21, 1937
Fig. 1.
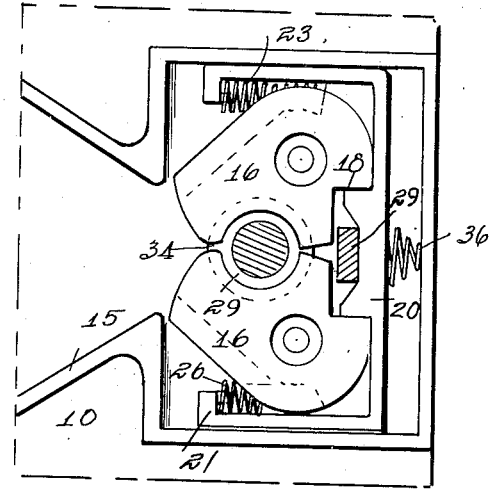
Fig. 3.
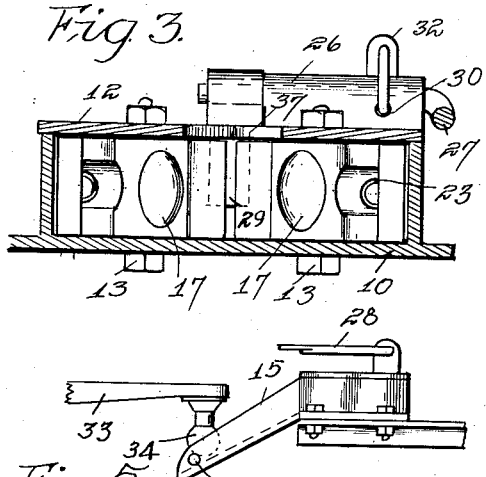
Fig. 5.
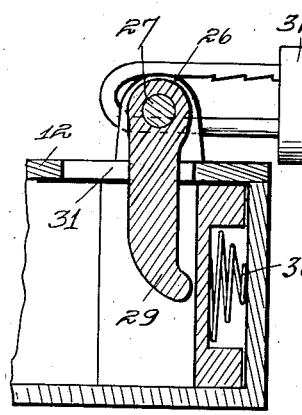
Fig. 2.
Fig. 6.
Fig. 4.
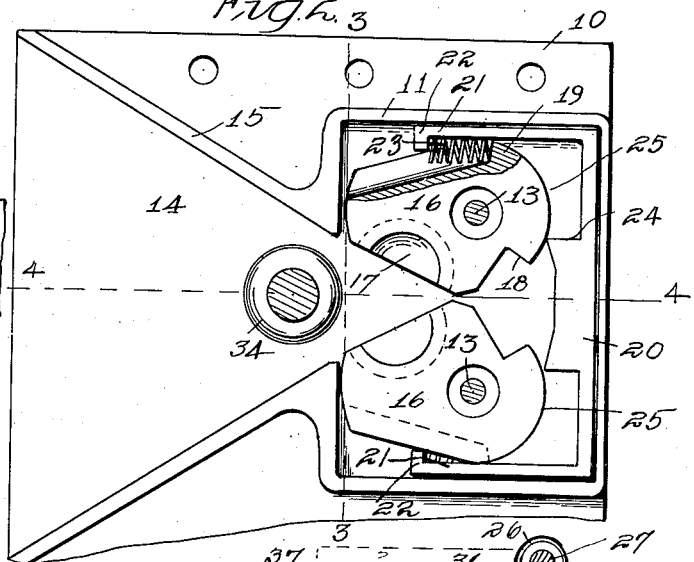
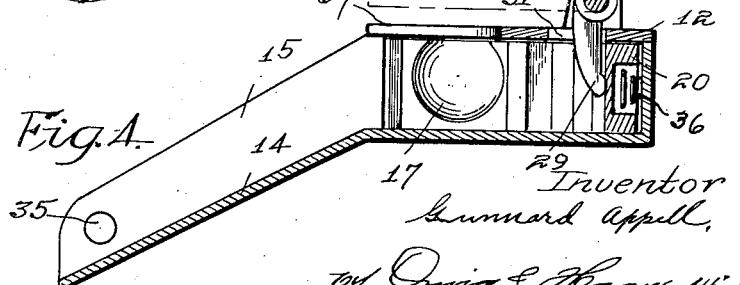
Inventor
Gunnard Appell
by Owing & Hague Attys Patented Mar. 21, 1939

2,151,181

UNITED STATES PATENT OFFICE 2,151,181

VEHICLE COUPLING

Gunnard Appell, Des Moines, Iowa

Application June 21, 1937, Serial No. 149,391

2 Claims. (Cl. 280—33.1)

My invention relates to that class of vehicle couplings which are intended primarily for use in coupling trailers to automobiles. The objects of my invention are to provide a coupling of this class whereby when a vehicle having one of the coupler members attached thereto is backed toward the trailer, the forward end of the trailer will be automatically elevated and its coupler member guided between the coupling jaws, and the jaws will be automatically locked, thereby avoiding any necessity of having an operator stationed between the two vehicles when being coupled, and providing means for automatically both elevating the trailer and completing the coupling operation.

A further object is to provide a coupling of this class of simple, durable and inexpensive construction, having few parts and which may all be made of malleable castings and which require a minimum of machine work.

A further object is to provide a coupling of this class in which, when the coupling jaws are in engagement with the coupling ball on the trailer, they will be firmly and securely locked and held against all the strains and stresses to which they are ordinarily subjected, and, further, to provide a coupling of this class in which the coupling jaws may be manually unlocked to release the coupling member on the trailer with a minimum of applied power so that the trailer may be easily released and when thus released its forward end will move downwardly to position resting on the ground without the necessity of any manual operation for this purpose.

A further object is to prvide a coupling of this class to which an ordinary padlock may be applied in such manner as to lock the coupling jaws in closed position to prevent removal of the trailer from the automobile.

In the accompanying drawing Figure 1 shows a top or plan view, with the cover removed, of a portion of my improved coupling member containing the coupling jaws, with the jaws shown in locked position and the coupling member of the trailer shown in section between the jaws.

Figure 2 shows a similar view with the jaws open, part of one of the jaws being broken away to show the latch operating spring.

Figure 3 shows a vertical sectional view on the line 3—3 of Figure 2.

Figure 4 shows a vertical sectional view on the line 4—4 of Figure 2.

Figure 5 shows a side elevation showing a portion of an automobile frame with my improved coupling applied thereto and a portion of the coupling member to be attached to a trailer; and Figure 6 shows an enlarged detail vertical sectional view illustrating a padlock applied to a coupling to prevent uncoupling.

Referring to the accompanying drawing I have used the reference numeral 10 to indicate generally the base plate of the coupling. Extending upwardly from the forward portion of the base plate is the frame 11 in which the coupling jaws are contained, and 12 indicates a cover detachably secured by bolts 13 to the base plate. The rear portion of the base plate is formed into a ramp 14 which is inclined downwardly and rearwardly and which is provided with upright guide walls 15 converging from the rear of the ramp toward the front.

Pivotally mounted upon the bolts 13 are two coupling jaws indicated generally by the numeral 16. Each of these jaws has at its rear inner end a substantially hemispherical recess 17, and at its rear end a shoulder 18. At its outer side there is a shoulder 19.

Slidingly mounted upon the forward end portion of the base plate is a latch comprising a body portion 20 and having at each side a rearwardly extended arm 21 with an inwardly extended shoulder 22 at its rear end, and placed between the shoulder 19 and the shoulder 22 is an extensile coil spring 23 for normally holding the jaws 16 at their open positions of movement.

Formed near the central portion of the latch 20 are two rearwardly extended shoulders 24 and the forward end portions of the jaws are rounded at 25. These parts are so positioned that when the jaws are in their open position, as shown in Figure 2, the rear ends of the shoulders 24 will rest upon the rounded portions 25 of the jaws so that the jaws may freely swing relative to the said shoulders, and when the rearward ends of the jaws are in their closed position, as shown in Figure 1, then the latch device will be moved rearwardly by a spring 36 and the shoulders 24 will enter between the forward ends of the jaws and engage the shoulders 18 of the jaws, thereby locking the jaws in closed position.

Formed on the top of the cover 12 is a housing 26 in which is mounted a rock shaft 27. On one end of this rock shaft is a handle 28, and on the other end is an arm 29 which extends downwardly at the rear central portion of the latch and whereby when the handle is rocked, the arm 29 will move the latch forwardly to position for releasing the locking jaws. For the purpose of locking the rock shaft 27 in locked position on the jaws I have formed in the housing 26 an opening 30, and a portion of the shaft 27 is cut away at 31 forming a flat spot on the shaft. These parts are so arranged that an ordinary padlock 32 may be extended through the opening 30 in a position engaging with the flattened portion 21 of the shaft to thereby prevent manual turning of the shaft and to thereby securely lock the trailer to the automobile.

The other coupling member to be attached to the trailer comprises an arm 33 having a spherical, downwardly extended coupling member 34 fixed to its forward end. The hemispherical recesses 17 of the coupling jaws are so positioned upon the jaws that when the coupler ball 34 enters between the jaws and pressure is applied to force the coupler jaws rearwardly against the coupler ball, this pressure will overcome the tension of the springs 23 and move the jaws to the position shown in Figure 1, whereupon the latch device will move rearwardly and lock the jaws.

In practical use trailers are customarily supplied either with a supporting leg or wheel at the front, and when connected to an automobile this supporting leg or wheel is at sufficient height above the roadway to avoid interference with the roadway. Ordinarily, in order to couple an automobile to a trailer an operator must manually elevate the coupler member on the trailer before it can become coupled to the coupling member on the automobile, and this involves considerable danger to the operator. With my improvement, however, the automobile is simply backed toward the coupling member 33, and when this coupling member is engaged it is automatically elevated and the front end of the trailer is also elevated and the ball 34 is automatically guided into position between the coupling jaws. When the ball enters between the jaws there is sufficient power exerted by the automobile in backing to overcome the pressure of the springs 23 and permit the jaws to move to closed position around the ball, whereupon the latch automatically moves rearwardly and locks the jaws, and when this operation is completed, which is entirely automatic, the vehicles are coupled in such manner that they cannot become released by any of the ordinary strains and stresses to which they are subjected when in use. Furthermore, the trailer may be placed in a suitable position, and then the operator simply manipulates the handle 28 to move the latch forwardly, whereupon the automobile may be advanced a slight distance and the ball 34 will slide down the ramp 14 until the supporting legs or wheel on the trailer rest upon the ground. The coupling member 34 is made spherical and the recesses 17 hemispherical so that when in coupled position the trailer and car may have free relatively vertical movement, thereby avoiding the necessity of pivotally supporting the base plate 10. The springs 23 apply yielding tension to the jaws 16 and to the latch 20 when the jaws are open and also when closed. By this means, rattling of these movable parts is prevented.

The members 15 are provided at the rear ends with openings 35 to provide means to which safety chains or cables from the trailer may be connected to prevent the trailer from becoming detached in case of breakage of the coupling device.

The cover 12 is provided with a notch or slot 37 to receive the upper end of the ball 34 as it enters the sockets 17.

To prevent unauthorized releasing of the trailer from the automobile I have provided a very simple and inexpensive means for applying an ordinary padlock to the coupler to prevent such unauthorized release.

I claim as my invention:

1. In a vehicle coupling, the combination of a base plate to be attached to a vehicle, two jaws pivotally mounted on the base plate and each formed with a recess at its rearward end portion and with a shoulder at its forward end portion, a latch slidingly mounted on the base plate and having a rearwardly extended latch arm at each side and also having two shoulders extended rearwardly near its central portion and a spring engaging each latch arm and the adjacent coupling jaw for yieldingly holding both the latch and jaws in open position and to prevent rattling, said parts being so constructed and arranged that as the rearward ends of the jaws are moved toward each other the shoulders on the forward ends of the jaws will move outwardly past the shoulders on the latch, thereby permitting the latch to move rearwardly and between the shoulders on the jaws to lock the jaws in said position.

2. In a vehicle coupling, the combination of a base plate to be attached to a vehicle, two jaws pivotally mounted on the base plate and each formed with a recess at its rearward end portion and with a shoulder at its forward end portion, a latch slidingly mounted on the base plate and having a rearwardly extended latch arm at each side and also having two shoulders extended rearwardly near its central portion, a spring engaging each latch arm and the adjacent coupling jaw for yieldingly holding both the latch and jaws in open position and to prevent rattling, said parts being so constructed and arranged that as the rearward ends of the jaws are moved toward each other the shoulders on the forward ends of the jaws will move outwardly past the shoulders on the latch, thereby permitting the latch to move rearwardly and between the shoulders on the jaws to lock the jaws in said position, a housing carried by the plate, a rock shaft mounted in the housing, a hand lever on the shaft, an arm fixed to the shaft for moving the latch forwardly, said housing having an opening therein and said shaft having a flattened side, and a lock extended through said opening and in engagement with said flattened side to prevent rotation of the rock shaft.

GUNNARD APPELL.